(12) United States Patent
Lin et al.

(10) Patent No.: US 6,487,530 B1
(45) Date of Patent: Nov. 26, 2002

(54) METHOD FOR RECOGNIZING NON-STANDARD AND STANDARD SPEECH BY SPEAKER INDEPENDENT AND SPEAKER DEPENDENT WORD MODELS

(75) Inventors: Lin Lin, Toronto (CA); Ping Lin, Toronto (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/281,078

(22) Filed: Mar. 30, 1999

(51) Int. Cl.[7] ............................................... G10L 15/06
(52) U.S. Cl. ...................................................... 704/244
(58) Field of Search .............................. 704/244, 251; 379/88.01, 88.03

(56) References Cited

U.S. PATENT DOCUMENTS

| | | | | |
|---|---|---|---|---|
| 4,618,984 A | * | 10/1986 | Das et al. ................... | 704/244 |
| 5,165,095 A | * | 11/1992 | Borcherding ............ | 379/88.03 |
| 5,719,921 A | * | 2/1998 | Vysotsky et al. ........ | 379/88.01 |
| 5,774,841 A | * | 6/1998 | Salazar et al. ............... | 704/225 |
| 5,835,570 A | * | 11/1998 | Wattenbarger ........... | 379/88.03 |
| 6,076,054 A | * | 6/2000 | Vysotsky et al. ........... | 704/240 |

OTHER PUBLICATIONS

The HTK Book, Version 2.1, Steve Young et al, Cambridge University Technical Services Ltd., Mar. 1997, Chapter 1.

* cited by examiner

*Primary Examiner*—Marsha D. Banks-Harold
*Assistant Examiner*—Donald L. Storm
(74) *Attorney, Agent, or Firm*—Gibbons, Del Deo, Dolan, Griffinger & Vecchione (57) ABSTRACT

A system and method for speech recognition includes a speaker-independent set of stored word representations derived from speech of many users deemed to be typical speakers and for use by all users, and may further include speaker-dependent sets of stored word representations specific to each user. Utterances from a user which match stored words in either set according to the ordering rules are reported as words.

10 Claims, 6 Drawing Sheets

METHOD FOR RECOGNIZING NON-STANDARD AND STANDARD SPEECH BY SPEAKER INDEPENDENT AND SPEAKER DEPENDENT WORD MODELS

FIELD OF THE INVENTION

This invention pertains generally to speech recognition, and more particularly to methods of recognizing non-standard speech.

BACKGROUND OF THE INVENTION

Methods of recognizing and electronically transcribing human speech are known in the art. (See, for example, *The HTK Book,* Version 2.1, Steve Young et al, Cambridge University Technical Services Ltd., March 1997, Chapter 1.) They are generally based on storing mathematical models of spoken words, converting incoming utterances into mathematical models, and attempting to match the models of incoming utterances with stored models of words.

A well known application of this technology is a dictation program for a personal computer (PC), which allows a user to create a text file by dictating into a microphone, rather than by typing on a keyboard. Such a program is typically furnished to the user with associated audio hardware, including a circuit board for inclusion in the user's PC and a microphone for connection to the circuit board.

Typically, a user newly acquiring a dictation program "trains" it (i.e., spends several hours dictating text to it.) The program uses the training speech stream for two purposes: i) to determine the spectral characteristics of the user's voice (as delivered through the particular supplied microphone and circuit board) for its future use in converting the user's utterances to mathematical models; and ii) to determine words spoken by the particular user that the program has difficulty matching with its stored mathematical models of words.

A speech-recognition program, such as a dictation program, is typically supplied with a library of stored word models derived from the speech of a large number of speakers. These are known as speaker-independent models. For most users, there are some words that do not match the speaker-independent models. For some users, this may be because of accents, regional speech variations, or vocal anomalies. Such users will be referred to herein as "non-standard users".

For words of a particular user, identified during the training phase as difficult to reliably match against speaker-independent models, the dictation program "learns" (i.e., derives and stores) word models from the particular user. These are known as speaker-dependent models or user-trained models. The user-trained model for a word is stored in place of the original speaker-independent word, which is no longer used for recognizing the particular user's speech. Non-standard users typically require a greater number of user-trained models than standard users.

An emergent application of speech recognition is in voice messaging systems. The traditional means for a user to access such a system is to dial in by telephone, and request message services by pressing keys on the telephone's keypad, (e.g., "1" might connote PLAY, "2" might connote ERASE, etc.). The user may first be required to provide an identification of himself and enter a password, or the system may assume an identity for the user based on the extension from which he calls.

Applications are emerging wherein a user operates the voice messaging system by voice commands—e.g., by saying the words PLAY, ERASE, etc., rather than by pressing code keys on the keypad. To initiate a call, a user might speak the called party's number or name rather than "dial" the number by pressing keypad digits.

There are some difficulties encountered in speech recognition in a voice messaging system that are not encountered in a dictation system: i) users would find it onerous to expend several hours training a voice messaging system; ii) unlike the single microphone and audio circuit board of a dictation system, users of a voice messaging system might call the system from many different telephone instruments which might connect over paths differing in quality from call to call, and which might use different kinds of networks from call to call. These difficulties compound the difficulties with recognition of utterances from non-standard users.

An approach that has been tried to aid the recognition of utterances by non-standard users is to regenerate the speaker-independent models, including the speech of one or more non-standard users along with the previous sampling of users. This is time-consuming and costly, and may actually degrade the models.

Another approach that has been tried is to eliminate the speaker-independent models and match user utterances against a speaker-dependent set of word models specifically created for each non-standard user. This approach, although feasible with the limited vocabulary that may be required in a voice messaging system, does not take advantage of the large amount of work that has been done in the course of preparing speaker-independent models in the areas of modeling the audio characteristics of various speech transmission media (e.g., telephone lines), or in modeling the co-articulation that occurs in streams of continuous speech.

There is thus a need for a speech recognition system that is based on a speaker-independent set of stored words but which can adapt in a speaker-dependent manner to a non-standard speaker without a long training period.

Accordingly it is an object of the present invention to provide improved recognition of utterances from a non-standard speaker.

It is a further object of the present invention to provide a speech recognition system based on a speaker-independent set of stored words which can adapt in speaker-dependent manner to utterances from a non-standard speaker.

It is a further object of the present invention to provide speech recognition that does not require a long training period.

It is a further object of the present invention to provide reliable speech recognition of user utterances in conjunction with a large variety of transmission media.

These and other objects of the invention will become apparent to those skilled in the art from the following description thereof.

SUMMARY OF THE INVENTION

In accordance with the teachings of the present invention, these and other objects may be accomplished by the present system of speech recognition in which an incoming audio signal is compared against stored models of words, reporting as words portions of the audio signal matching stored models, practiced with the present method of providing a set of stored word models derived from utterances of many users and for use by all users, and providing for further use by certain users second sets of stored word models, each set derived from the utterances of one of the certain users and for use only in association with audio signal from that one of the certain users. A portion of incoming audio signal matching a stored model from either set is reported as the corresponding word.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

A vocabulary is determined for a particular application, in a particular language, and perhaps in a particular regional variation of that language. For a voice messaging system to be deployed in the English language, for example, the vocabulary might consist of the names of the ten numerical digits (zero through nine) and appropriate command words such as PLAY, NEXT, LAST, ERASE, STOP, etc. A group of people deemed to be standard speakers of the language are asked to provide spoken specimens of the vocabulary words. A set of speaker-independent word models is constructed according to a composite or according to an average of those spoken specimens. Possibly, sets of speaker-independent word models are constructed for each of several transmission media (types of telephone terminal equipment, types of telephone networks, etc.).

There may also be speaker-dependent word models for each user, which are constructed, as will be described, from specimens of words spoken by the particular user.

Figure 3:
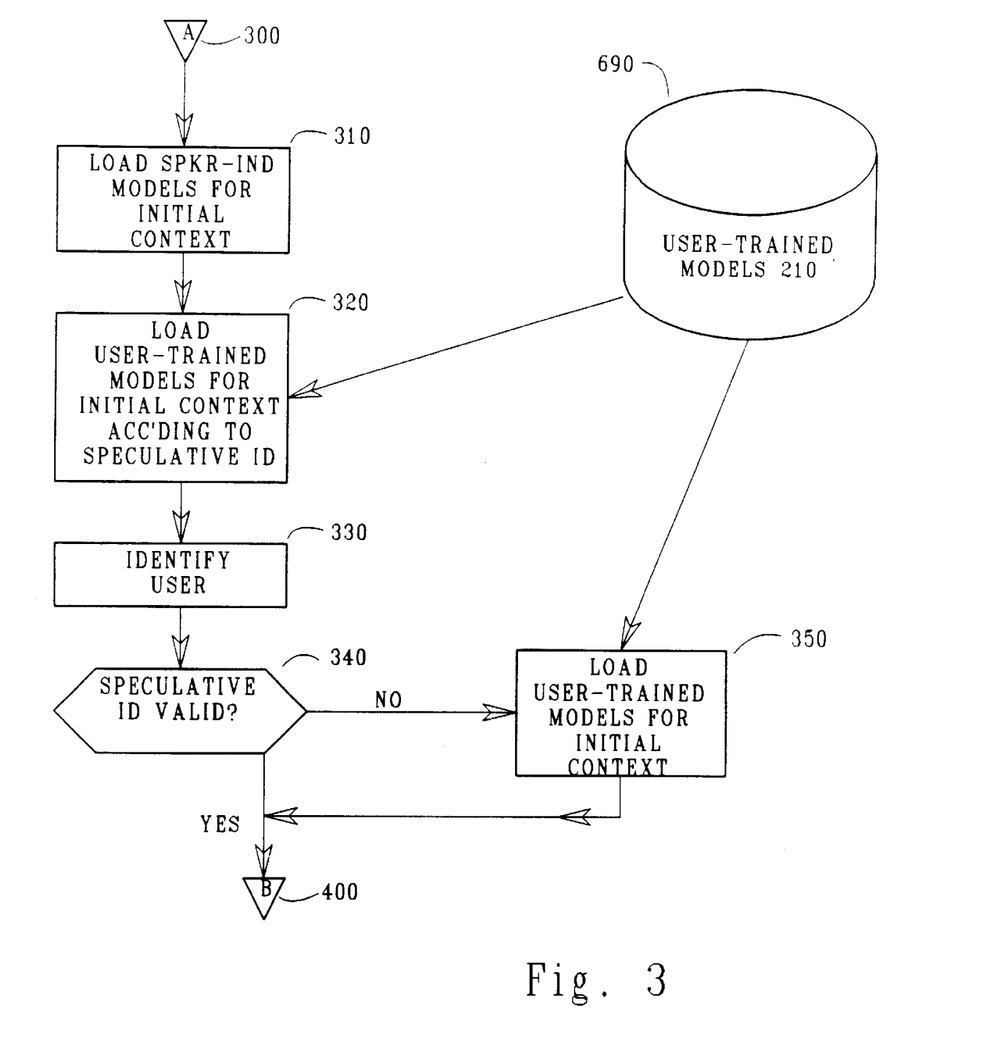
FIG. 3 is a flow chart of actions taken when a user initiates access to a system constructed according to the present invention.

FIG. 3 is a flow chart showing actions that take place when a user initiates access to a voice messaging system of the present invention. The flow is entered at connector 300, and block 310, according to predetermined parameters, establishes an initial "context". The context includes speaker-independent models, in a particular language, for the words that the user is permitted to speak upon initiating access to the system.

The user is speculatively identified according to such factors as the extension from which he is calling. In block 320, any user trained models 210 that are valid in the present context for the speculatively identified user are loaded. (The generation of user-trained models 210 is discussed below in connection with FIG. 6.)

The user provides a login code or a password to positively identify himself, either by spoken utterances or by keypad entries. His code or password is verified in block 330. If the user provided spoken utterances, block 330 interprets these according to the models presently loaded.

Block 340 then determines, according to the user's positive identification, whether the speculative identification made in block 320 was valid. If it was not, block 350 is invoked to load user-trained models corresponding to the identified user and valid in the initial context. These models replace any user trained models that may have been loaded in block 320.

Figure 4:
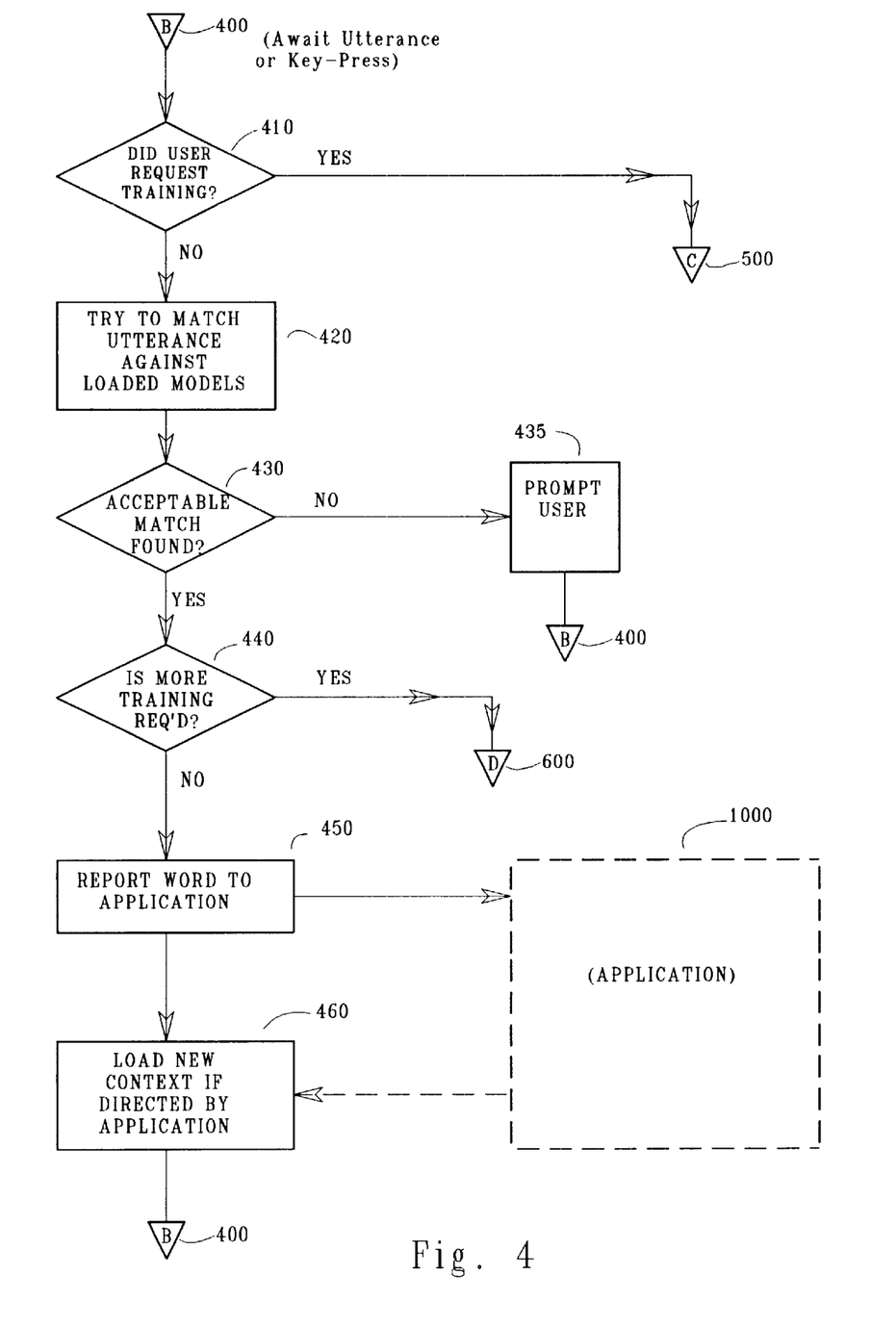
FIG. 4 is a flow chart illustrating recognition of utterances of a user according to the present invention.

Control then passes, through connector 400, to the process depicted in FIG. 4. A user utterance or a user key-press is awaited.

Block 410 determines, by recognizing the appropriate key-press or by matching the user's utterance against the appropriate one of the stored models, whether the user has requested to train the system. If so, control is dispatched through connector 500 the flow depicted in FIG. 5 (to be discussed below).

If the user has not requested training, block 420 attempts to match the user's utterance against the stored models, which include speaker-independent and user trained models for the words acceptable in the current context in the current language. For some words, there may be two models: one speaker independent and on user-trained. An indication is generated of the word with the best probability of matching the user's utterance, and an assessment of that probability.

Block 430 determines whether the probability of a match exceeds a predetermined threshold (i.e., whether it may be supposed that an actual match, as opposed to a mere similarity, has been found). If not, the user is informed by block 435 that his utterance does not match any of the words acceptable in the current context. He may be informed of what words are valid in the current context, and control returns to connector 400, where the user may re-attempt to speak a word or he may request to enter training through block 410.

After an acceptable match is found, block 440 may determine that more training is required for the matched word, according to such criteria as the number of attempts required to match the word and the match probability. Control would then pass through connector 600 to the flow depicted in FIG. 6 (to be discussed below).

Block 450 reports the matched word to the main application 1000, which executes the actions requested by the user. Application 1000 is a voice messaging system in the present example. The internals of application 1000 will not be discussed herein.

According to the word spoken by the user, the application may instruct block 460 that a new context is to take effect. For example, the user may have spoken a command such as CALL, indicating that he wishes to place a call; the new context would be established in which the user could speak the digits of the called party's number, but in which he could not speak command words such as CALL. If a new context is to be loaded block 460 loads speaker-independent word models and user-trained models (if any) of words valid in the new context.

Control then passes to connector 400 to repeat the flow of FIG. 4 for the next user utterance or key-press.

Figure 5:
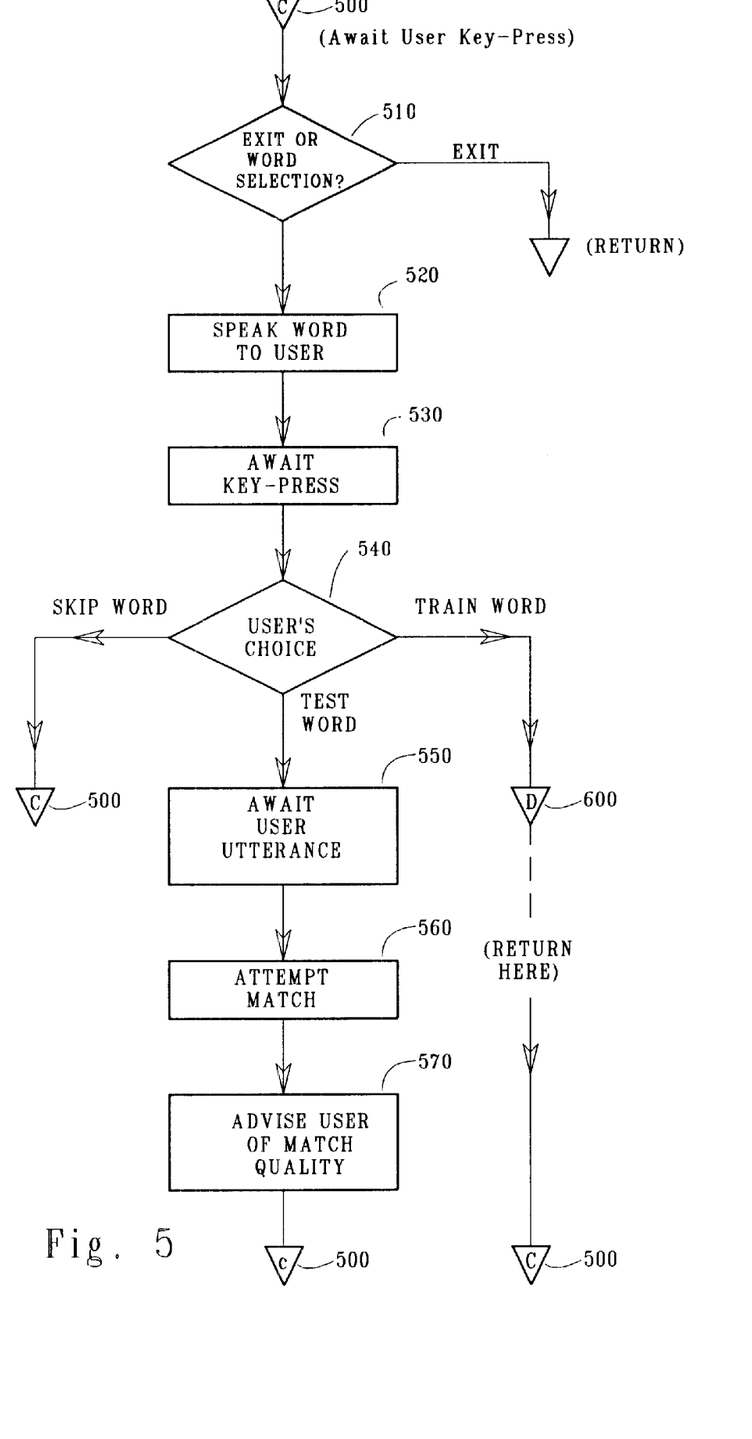
FIG. 5 is a flowchart depicting user training of word models and user testing of word models according to the present invention.

FIG. 5 is entered through connector 500 when the user requests to train the system. Block 510 may be used at any time to return the user back to the previous flow when he so requests by pressing a predetermined key on his keypad.

Otherwise, he may press a key that directs block 520 to speak to him a word from the vocabulary of the current language. (Each pass through the flow of FIG. 5 will use a different one of the words.) He then may press predetermined keys that block 530 passes to block 540 for interpretation as whether he wishes to skip, test, or train the word. Skipping the word simply returns him to connector 500 where he may exit training or go on to the next sequential word.

If he requests testing the word, he speaks the word and block 560 attempts to match the his utterance of the word against stored model(s) of it (the speaker-independent model, and the user-trained model if there is one). Block 570 advises him of the quality of the match, and returns him for another pass through the flow of FIG. 5.

If the user elects to train the word, control is dispatched to the flow of FIG. 6 to be discussed below. Upon returning therefrom, the user is dispatched to another pass through the flow of FIG. 5.

Figure 6:
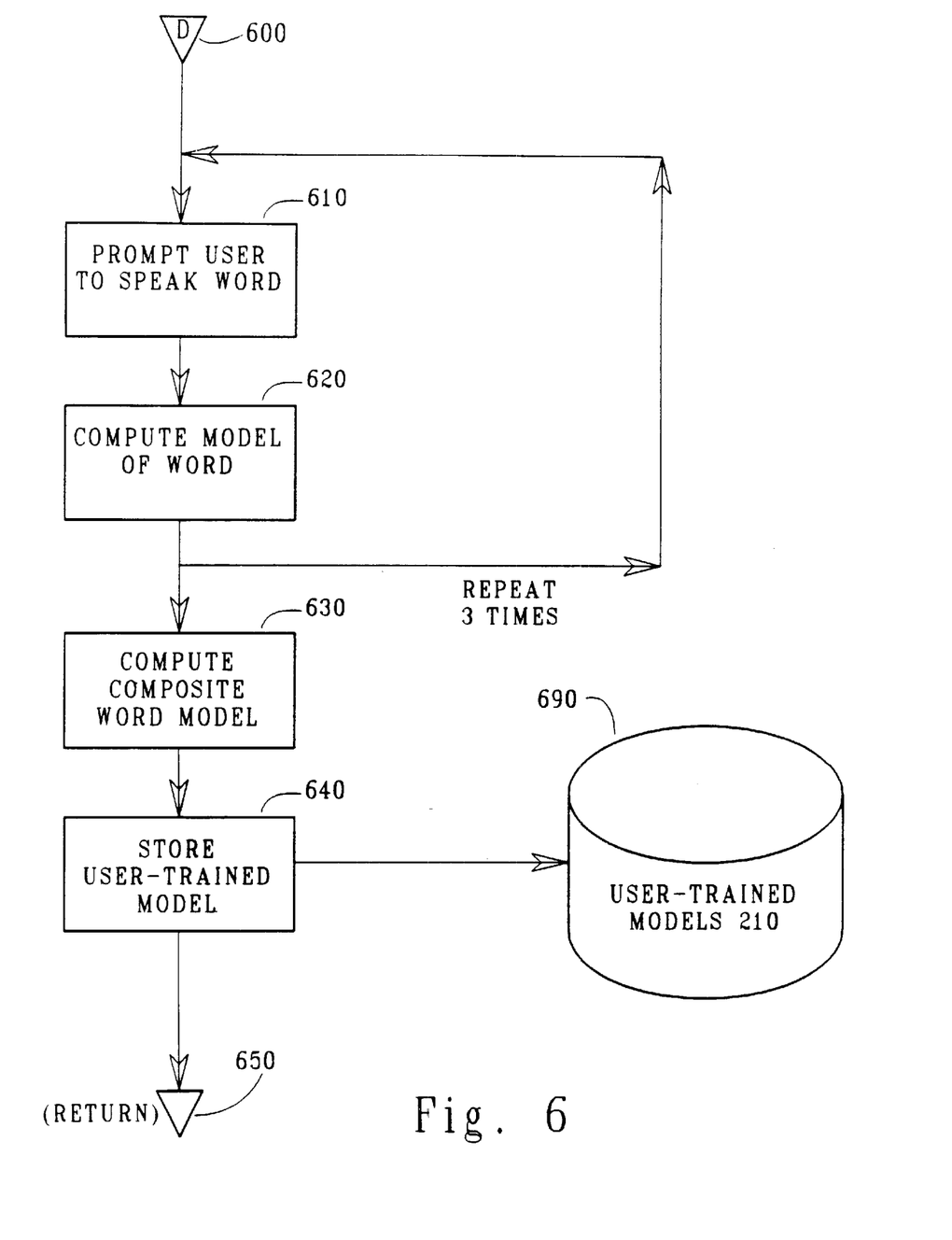
FIG. 6 is a flowchart depicting the generation of a user-trained word model according to the present invention.

FIG. 6 is entered through connector 600 when a user has requested to train a word, or when the flow of FIG. 4 has determined that he should train a word. The word is known upon entry to blocks 610 and 620, which are repeated a number of times (three in a preferred embodiment). Block 610 prompts the user to speak the word, and block 620 computes a model of the word.

Figure 1:
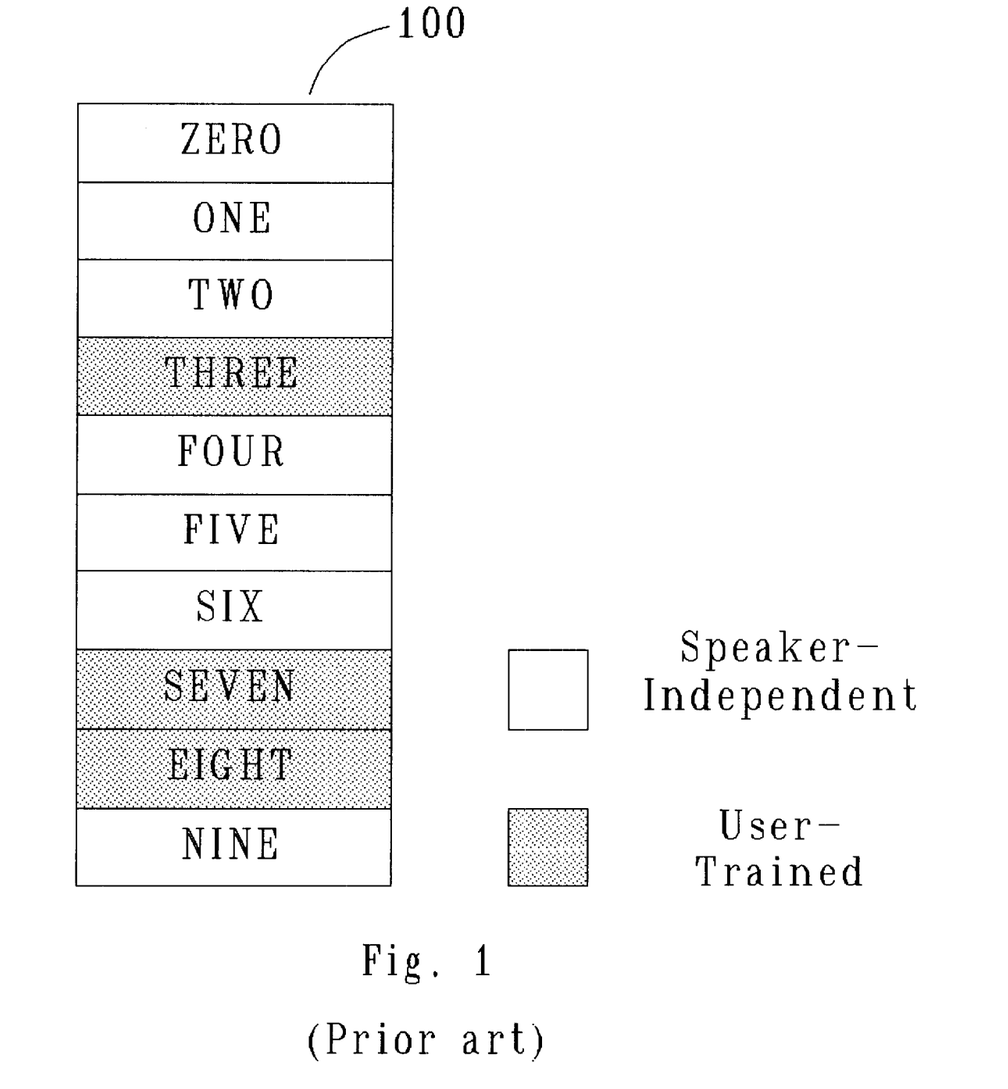
FIG. 1 depicts conventional stored word models.
Figure 2:
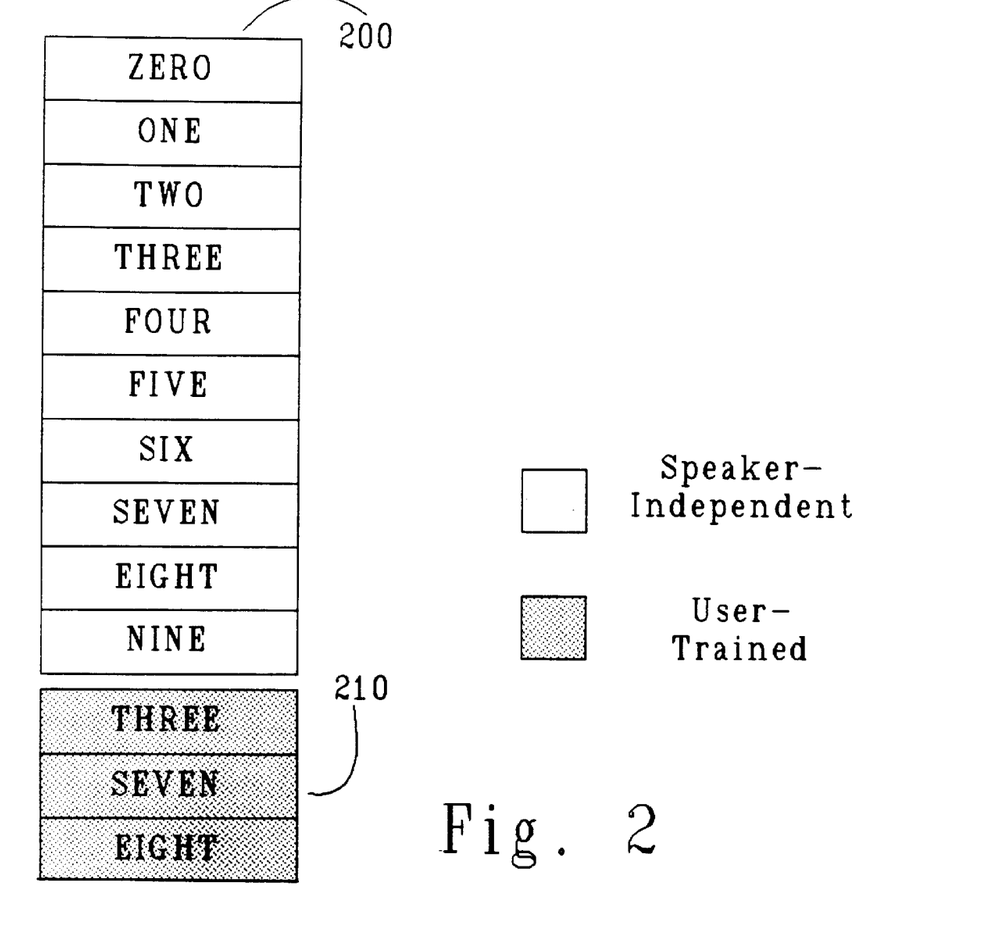
FIG. 2 depicts stored word models according to the present invention.

Block 630 computes a composite model from the models computed by the multiple executions of block 620. Block 640 stores the composite model thus computed in user-trained models 210 in a storage area associated with the current user in storage device 690. FIGS. 1 and 2 show conventional word models and word models according to the present invention, respectively. Unlike the practice in conventional systems, user-trained models 210 according to the present invention do not replace the corresponding speaker-independent models 200. Thus, if a user is not properly identified as discussed above, a good likelihood still exists that his utterances can be matched, at least in the speaker-independent models. Similarly, if a user calls in on a telephone connection that has markedly different or degraded characteristics from his normal connection there is still a good likelihood of recognizing his utterances.

This ability for user-trained models to co-exist with speaker-independent models allows the "coverage" of speaker-independent models to be extended to cover regional differences in speech; for example, a set of American-English-language models may be directly usable for most users who speak standard American English, while users whose pronunciation of certain words may be affected by regional variations can train those particular words.

It will thus be seen that the invention efficiently attains the objects set forth above, among those made apparent from the preceding description. In particular, the invention provides enhanced speech recognition of non-standard users without requiring a long training period and with adaptation to a variety of characters and qualities of transmission media. Those skilled in the art will appreciate that the configurations depicted in FIGS. 2, 3, 4, 5, and 6 and their supporting discussion in the specification provide enhanced speech recognition meeting these objects.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention,
what is claimed as new and secured by Letters Patent is:
1. In a speech recognition system comprising:
an incoming audio signal representing utterances of a user;
a stored set of first word models derived from utterances of a plurality of speakers; and
means for identifying a word in the utterances of a user upon matching portions of said audio signal with one of said stored first word models,
a method of enhancing recognition of speech of said user comprising:
ascertaining a current context of the utterances of the user;
providing for said user a stored set of second word models, said set of second word models derived from words spoken by said user, said first word models and said second word models differing from each other;
attempting to identify words in the utterances of said user to find a match in the current context by comparing portions of said audio signal with one of a word model among said first word models and a word model among said second word models associated with said user, the attempting including determining a probability of whether the match exceeds a threshold; and
if the probability of the match fails to exceed the threshold, informing that the words fail to match any of the words acceptable in the current context and thereafter modifying, based on the words in the utterances of said user, the word model among the second word models associated with the user and without modifying the stored set of first word models.

2. The method according to claim 1 further including:
inviting a user upon first use of the speech recognition system to speak training words for deriving said set of second word models;
deriving said set of second models from said training words; and
storing said set of second word models.

3. The method according to claim 2 wherein said set of second word models is stored in a separate memory location from said set of first word models.

4. The method according to claim 1 further including:
inviting a user to speak training utterances of a word upon a predetermined number of failures to identify the word among said first word models when no model for the word is present in said second models;
deriving a word model from said training utterances; and
storing the derived word model in said set of second word models.

5. The method according to claim 4 wherein said set of second word models is stored in a separate memory location from said set of first word models.

6. A method of enhancing speech recognition comprising:
providing a set of user-independent word models derived from utterances of a plurality of speakers;
providing a set of user-dependent word models for ones of a plurality of users each of the user-dependent word models being derived from utterances of an associated one of said users, said user-independent word models and said user-dependent word models differing from each other;
ascertaining a current context of the utterances of the user;
attempting to match an utterance from one of said users to one of said user-independent word models to find a possible match in the current context; and
attempting to match another utterance from said one of said users to one of said user-dependent word models to find a further match in the current context, determining probabilities of whether the possible match and the further match exceed a threshold; and if the probabilities of the possible match and the further match fail to exceed the threshold, informing that the words fail to match any of the words acceptable in the current context and thereafter modifying, based on the words in the utterances of said user, the user-dependent word models and without modifying the provided set of user-independent word models.

7. The method according to claim 6 further including:

inviting a new user to speak training words for deriving a set of user-dependent word models;

deriving said set of user-dependent models from said training words; and storing said set of user-dependent word models.

8. The method according to claim 7 wherein said user-dependent word models are stored in a separate memory location from said user-independent word models.

9. The method according to claim 6 further including:

inviting a new user to speak training utterances of a word upon a predetermined number of failures to identify the word among said user-independent word models when no model for the word is present in said user-dependent models;

deriving a word model from said training utterances; and storing the derived word model in said set of user-dependent word models.

10. The method according to claim 9 wherein said user-dependent word models are stored in a separate memory location from said user-independent word models.

* * * * *